March 22, 1960 R. L. KOEHLER 2,929,880

SUBSET IDENTIFICATION GATE CIRCUIT

Filed Oct. 24, 1955

INVENTOR.
ROBERT L. KOEHLER
BY Val R. Goldman
ATTORNEY

United States Patent Office 2,929,880

Patented Mar. 22, 1960

2,929,880

SUBSET IDENTIFICATION GATE CIRCUIT

Robert L. Koehler, Canoga Park, Calif., assignor to Ralph D. Collins, Beverly Hills, Calif.

Application October 24, 1955, Serial No. 542,239

14 Claims. (Cl. 179—17)

This invention relates to communication apparatus such as telephones, and particularly to a subscriber identification system whereby the calling subscriber's subset will be automatically identified at a central station. In a pending application, Serial No. 439,007, filed June 24, 1954, by Ralph D. Collins, to whom this application is assigned, a subscriber's identifying system is disclosed and claimed. My application, Serial No. 527,113, filed August 8, 1955, discloses and claims an improvement of the Collins' identifying system, which improvement resides primarily in the frequency generator used at the subset.

The present invention is directed to a code controlled circuit to prevent the central office equipment from responding to transient signals but only to the identifying signal. The code controlled circuit permits the receiving elements to receive the desired signal only at a specified point in the dialing operation, and at all other points the receiver is locked out to prevent false response from voice or other transients. Specifically, the identifying receiver will be electrically opened for receipt of the identifying alternating current frequencies only during the second series of dial pulses from the subset dial. The circuit also includes multivibrator units which insure that any identifying current will have sufficient amplitude to operate the standard code identifying unit at the central station.

The principal object of the invention, therefore, is to facilitate the identification of subscriber sets or subsets of a telephone system in a simple, economical, and accurate manner.

Another object of the invention is to provide an improved identification receiver of identifying currents.

A further object of the invention is to provide a code controlled circuit at the central office which prevents false identification of a subscriber station or subset by unwanted transient signals.

A still further object of the invention is to provide a code controlled circuit at a central office which is not subject to false signals and which provides sufficient amplitude of the desired signal for accurate operation of the identifying unit.

The novel features which are believed to be characteristic of this invention, both as to the manner of its organization and the mode of its operation, will be better understood from the following description when read in conjunction with the accompanying drawings, in which.

Figures 1, 2:
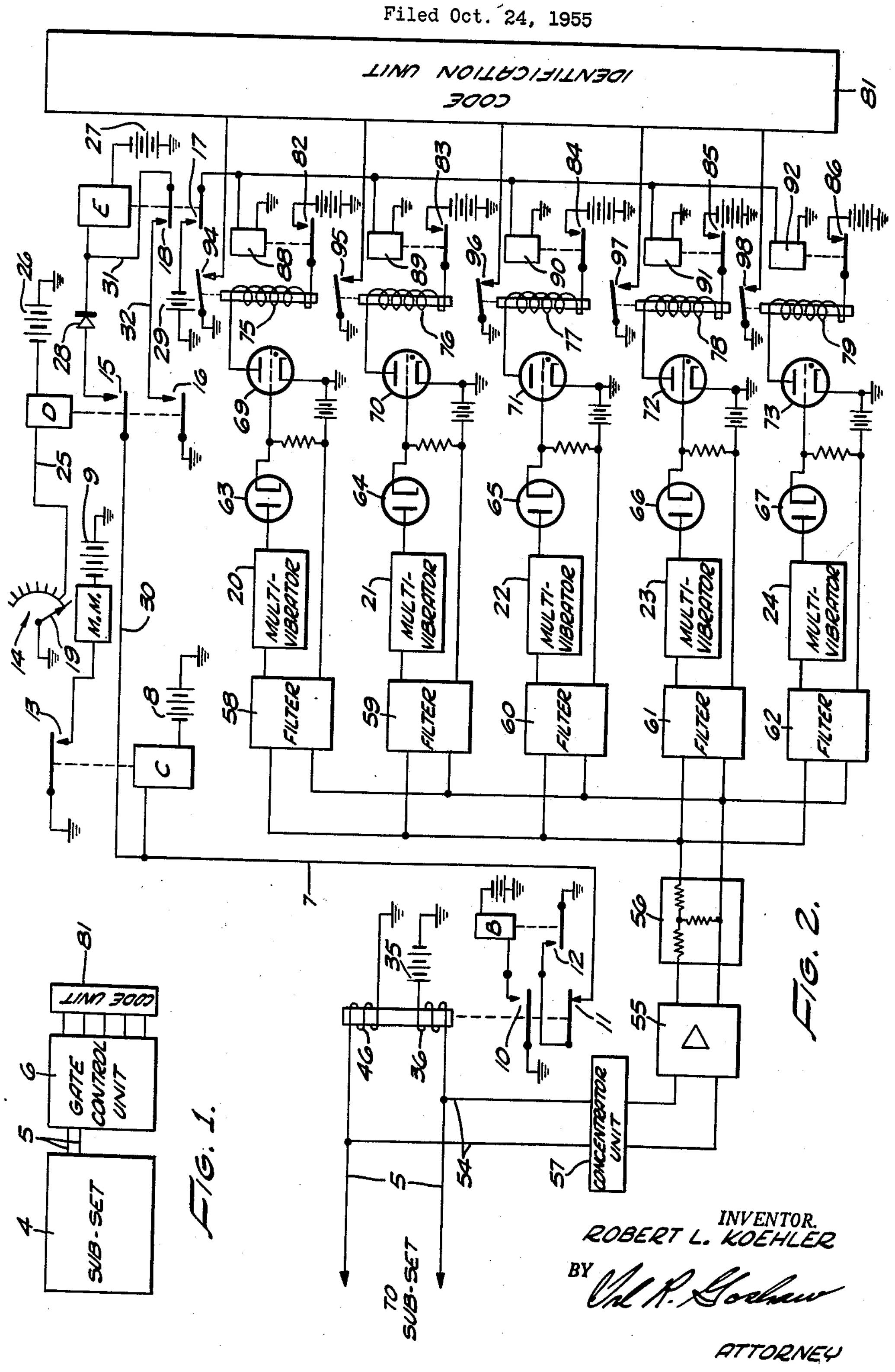
Fig. 1 is a block diagram of the complete system embodying the invention.
Fig. 2 is a combination schematic and block diagram of the central office equipment embodying the invention.

Referring now to the drawings, and particularly Fig. 1, the block 4 represents the subset circuit shown in either of the above-identified pending applications, the subset being connected by conductors 5 to central office equipment shown in block 6, which includes the central office equipment shown in the prior applications as modified by the present invention shown in Fig. 2. Block 81 is a standard code unit used at the central station and shown in the prior and present applications.

Referring now to Fig. 2, the dial impulses and the identifying currents are received over conductors 5 which energize the subset from a battery 35 over pulsing relay windings 36 and 46. The received identification signals are impressed over conductors 54 on a concentrator unit 57, then on a limiting amplifier 55 and an attenuating pad 56, and then on the inputs of a plurality of filters 58, 59, 60, 61, and 62. The identifying numerals for these elements are the same as those used in my co-pending application, Serial No. 527,113, mentioned above, to aid in identifying the common elements of the systems.

The filters just mentioned are connected to new circuit elements, namely, multi-vibrators 20, 21, 22, 23, and 24, which are then connected to their respective rectifiers 63, 64, 65, 66, and 67. The rectifiers are then connected to their respective thyratrons 69, 70, 71, 72, and 73 with their respective bias batteries and grounds. The anodes of the thyratrons just mentioned are connected to their respective relays 75, 76, 77, 78, and 79, which instead of being connected directly to their polarizing batteries now include a plurality of respective contacts 82, 83, 84, 85, and 86 actuated by respective solenoids 88, 89, 90, 91, and 92. The actuation of the solenoids 88 to 92, inclusive, will close their respective contacts 82 to 86, inclusive, which will energize the respective relays 75 to 79, inclusive, when the thyratrons fire, for closing their respective contacts 94, 95, 96, 97, and 98. The closing of these last-mentioned contacts will provide the desired actuation of the code identification unit in the well known manner. Although only five channels are shown, additional parallel channels will function in the manner described.

The use of the multi-vibrators 20 to 24, inclusive, insures a signal strength on the respective thyratrons 63 to 67, inclusive, to insure their operation regardless of the strength of the identification current being received at the vibrators.

Referring now to the remainder of the circuit which prevents unwanted transient signals, such as voice or other unwanted impulses from falsely operating the code identification unit, the pulsing relay windings 36—46 are energized immediately upon the removal of the handset at the subscriber's station and the direct current will close contacts 10 and open contacts 11 of this pulsing relay. The closing of contacts 10 energizes relay B to prepare an energizing circuit for relay C over contacts 12, contacts 11 when closed, conductor 7, and battery 8. Now when the dialing cam at the subset breaks the direct current circuit of pulsing relay 36—46, this relay will be de-energized, which will occur each time the dialing cam breaks its contacts.

The de-energization of the pulsing relay will permit its contacts 11 to close to energize relay C over the circuit described above. Relay B is a slow release relay and thus remains energized during the open periods of approximately 60 milliseconds of any series of pulses from the dialing cam. Thus its contacts 12 remain closed during an entire series of dialing pulses. So for each time that pulsing relay 36—46 is de-energized during any series of pulses from the subset dial, pulses are impressed on relay C over contacts 11 and 12. Relay C is also a slow release relay so it will not follow any series of dial pulses but will remain energized during any train of pulses from the pulsing relay 36—46. A train of pulses may consist of any number from one through ten, each of which is approximately 40 milliseconds duration.

The first energization of relay C closes its contacts 13 to energize a motor magnet MM over battery 9 to activate a mechanical driving cam on a sequence switch 14 having a rotary contactor 19 and ten contact elements. This motor magnet operates by cocking the driving cam upon its energization, and upon the de-energization thereof permits a spring to move the contactor 19 to its next contact element. The normal position of contactor 19 is on contact 1, and the first energization and de-energization of MM will move it to its second contact. It is moved to its second contact element at the end of the first series or train of impulses, at which time relay C is de-energized, due to pulsing relay 36—46 remaining energized and holding contacts 11 open because the handset at the subscriber's station is still removed.

Upon movement of contactor 19 to its second contact element, relay D is energized over conductor 25 and battery 26. The energization of relay D closes its contacts 15 and 16 and prepares an operating circuit for relay E, which will become operative on the first break pulse of the second series or train of dial pulses from the subset dial. The closing of contacts 15 of relay D will not energize either relay C or relay E because interconnected batteries 8 and 27 have opposing polarities. However, the first open pulse on the second series of dial pulses from the subset de-energizes pulsing relay 36—46 which permits the closing of contacts 11 to relay C and energizes motor magnet MM as above described. Simultaneously, relay E is now energized from battery 27 over contacts 15, conductors 30 and 7, contacts 11 and contacts 12.

The energization of relay E closes its contacts 18 and thus completes its locking circuit from battery 27 over conductor 31, contacts 18, conductor 32 and contacts 16. A rectifier 28 in the circuit of relays C and E prevents inverse current feedback to relay C over contacts 16 and 18. The operation of relay E also closes its contacts 17 which energizes solenoids 88 to 92, inclusive, from battery 29, which places polarizing potential on the respective thyratrons 69 to 73, inclusive, by closing respective contacts 82 to 86, inclusive. This action closes code unit contacts 94 to 98, inclusive. Thus, the channel receiving an identification tone through its respective filter will be connected to code unit 81.

Now at the end of the second series of impulses from the subset dial, the motor magnet MM is again de-energized to move the contact 19 off its second contact element and relay D is de-energized and its contacts 15 and 16 are opened. This de-energizes relay E by breaking its holding circuit contacts 16, which breaks contacts 18 and 17. The breaking of contacts 17 de-energizes relays 88 to 92, inclusive, which breaks contacts 82 to 86, inclusive. This action removes polarizing voltages from the thyratrons 69 to 73, inclusive.

Thus identifying pulses from the various subsets are received at the code identification unit 81 only during the second series of pulses of the subset dial and any transient pulses in the subscriber's line caused by voice or other sources are not transmitted to the unit 81. In this manner, there is no false identification of any particular subset, each having its own frequency which will be transmitted to its respective multi-vibrator by the filters 58 to 62, inclusive.

I claim:

1. A code controlled circuit for a telephone subscriber's subset identification system comprising a plurality of transmission circuits, a pulsing relay adapted to be energized by the dialing pulses from said subset, a pair of contacts, one of which is adapted to be made and another broken upon energization of said pulsing relay, a first slow release relay energized by the energization of said pulsing relay, a second slow release relay adapted to be energized upon the de-energization of said pulsing relay, a step mechanical contactor having a plurality of contacts and energized by the operation of said second slow release relay, a relay energized by the making of a certain contact of said mechanical contactor, and a relay energized by the energization of said relay energized by said mechanical contactor for making operative said plurality of transmission circuits.

2. A code controlled circuit in accordance with claim 1 in which said mechanical contactor closes a connection at only one step position, and said last mentioned relay is locked energized until the de-energization of said relay energized by said mechanical contactor.

3. A code controlled circuit for a telephone subscriber's subset identification system comprising a plurality of circuits, each circuit being receptive to a particular frequency from one of a plurality of said telephone subscriber's subsets, said circuits including respective thyratrons, a plurality of polarizing circuits for said thyratrons adapted to be closed and opened, a pulsing relay responsive to dialing pulses received from said telephone subsets, a step mechanical contactor adapted to close a relay circuit at one step position thereof upon a predetermined series of dialing pulses from said subsets, and a plurality of intermediate relays for advancing said contactor one step for each series of dialing pulses.

4. A code controlled circuit for a telephone subscriber's subset identification system for permitting different frequency identification signals to be transmitted during a predetermined series of dialing pulses comprising a plurality of receiving circuits selective to a predetermined identification frequency, means in said circuits for making said circuits operative and inoperative, a step mechanical contactor adapted to be advanced one step by each series of pulses from a subscriber's subset, one step position of said contactor completing a circuit, and relay means in said circuit and controlled thereby for making said selective circuits operative to receive said identification signals during the reception of one predetermined series of dial impulses.

5. A code controlled circuit in accordance with claim 4 in which a multi-vibrator unit is included in each of said receiving circuits for increasing the strength of said identification signals.

6. A code controlled circuit in accordance with claim 4 in which are provided a pulsing relay having contacts responsive to dialing impulses from said subsets, a first relay responsive to the first of a series of impulses, a second relay responsive to the first break between a series of impulses, the operating of said second relay energizing said step mechanical contactor to advance said contactor one step upon the de-energization of said second relay.

7. A code controlled circuit in accordance with claim 4 in which said relay means includes a self-locking relay for holding said selective circuits operative during said one predetermined series of dial impulses.

8. A code controlled circuit in accordance with claim 7 in which said self-locking relay is actuated upon the break after the first pulse in said one predetermined series of impulses.

9. A gate circuit for making operative a transmission circuit during a predetermined series of a plurality of series of electrical impulses comprising a pulsing relay having contacts adapted to be actuated upon each pulse of each series of impulses, a first relay connected to one of said contacts and actuated upon the first impulse of each series of impulses, a second relay connected to another of said contacts and actuated upon the break after said first impulse of each series of impulses, a step contactor actuated by energization of said second relay and advanced one step by the de-energization of said second relay, and relay means connected to said contactor and actuated by one predetermined step position of said contactor for making said transmission circuit operative.

10. A gate circuit in accordance with claim 9 in which said relay means includes a polarizing relay for said transmission circuit, and a self-locking relay connected to and intermediate said contactor and said polarizing relay, said self-locking relay being locked in energized position during said one predetermined series of impulses.

11. A gate circuit in accordance with claim 10 in which means are provided for interconnecting said second relay and said self-locking relay, said self-locking relay being energized upon the de-energization of said pulsing relay.

12. A subset identification system comprising a subset, a central station, a line interconnecting said subset and said central station, and a pair of parallel line systems at said central station, one of said parallel line systems including tuned circuits connected to said line for transmitting identification signals of different frequencies one of which is from said subset and the other of said parallel line systems including relays connected to said line for transmitting a series, a pulse signals, said pulse signals controlling the transmission of said identification signals of different frequencies at predetermined times.

13. A subset identification system comprising a subset, a central station, a line interconnecting said subset and said central station, and a pair of parallel line systems at said central station, one of said parallel line systems being connected to said line for transmitting identification signals of different frequencies, one of which is from said subset and the other of said parallel line systems being connected to said line for transmitting a series of pulse signals, said pulse signals controlling the transmission of said identification signals of different frequencies at predetermined times, said first-mentioned parallel line system including a plurality of parallel tuned circuits, each of said tuned circuits having an output circuit, and said second-mentioned parallel line system including a plurality of serially-connected relays for making operative said output circuits of said tuned circuits at a predetermined period of transmission of a series of said pulse signals.

14. A subset identification system comprising a subset, a central station, a line interconnecting said subset and said central station, and a pair of parallel line systems at said central station, one of said parallel line systems being connected to said line for transmitting identification signals of different frequencies, one of which is from said subset and the other of said parallel line systems being connected to said line for transmitting a series of pulse signals, said pulse signals controlling the transmission of said identification signals of different frequencies at predetermined times said second-mentioned parallel line system including a step contactor and said first-mentioned parallel line system including a plurality of tuned circuits, each having an output circuit with a relay therein, and means between said step contactor and said relay for energizing all of said relays in said output circuits upon reception of a predetermined series of pulses in said second-mentioned parallel line system.

References Cited in the file of this patent

UNITED STATES PATENTS

| | | |
|---|---|---|
| 2,352,492 | Ostline | June 27, 1944 |
| 2,410,520 | Ostline | Nov. 5, 1946 |
| 2,535,765 | Voss | Dec. 26, 1950 |
| 2,542,592 | Styrene | Feb. 20, 1951 |
| 2,619,546 | Myers | Nov. 25, 1952 |
| 2,717,279 | Matlack et al. | Sept. 6, 1955 |
| 2,733,297 | Matlack et al. | Jan. 31, 1956 |